(12) United States Patent
Ain et al.

(10) Patent No.: US 6,442,638 B1
(45) Date of Patent: Aug. 27, 2002

(54) AUTO ENABLE/DISABLE SYSTEM AND METHOD FOR COMPUTER INTERFACED DEVICES

(75) Inventors: Jonathan Wade Ain; Steven J. Buller; Robert George Emberty; Craig Anthony Klein, all of Tucson, AZ (US); David Adam Sinclair, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,173

(22) Filed: May 18, 1999

(51) Int. Cl.[7] .............................................. G06F 13/00
(52) U.S. Cl. ...................................................... 710/302
(58) Field of Search ................................... 710/301, 302

(56) References Cited

U.S. PATENT DOCUMENTS

| | | |
|---|---|---|
| 5,386,567 A | 1/1995 | Lien et al. |
| 5,483,419 A | 1/1996 | Kaczeus, Sr et al. |
| 5,572,685 A | 11/1996 | Fisher et al. |
| 5,758,101 A | 5/1998 | Permberton |
| 5,781,744 A | 7/1998 | Johnson et al. |
| 5,784,576 A | 7/1998 | Guthrie et al. |

*Primary Examiner*—Glenn A. Auve
(74) *Attorney, Agent, or Firm*—Douglas R. Millett; Bracewell & Patterson, L.L.P.

(57) ABSTRACT

An automatic enable and disable system and method for a computer interfaced device linkable to an external computer system. Communication occurs when a computer interfaced device has been latched to and inserted into or unlatched and about to be removed from the external computer system. A sensor is coupled to a controller of the computer interfaced device, and a sensor component is coupled to a cam mechanism or other such component of the computer interfaced device. The sensor component is engagable to and disengagable from the sensor. The sensor senses engaging and disengaging of the sensor component respectively thereto and therefrom as the cam mechanism or such component is latched and unlatched. Latching of the cam mechanism or such component and the computer interfaced device is communicated to the external computer system when the sensor component is engaged to the sensor. Unlatching of the cam mechanism or such component and the fact that the computer interfaced device is about to be removed from the external computer system is communicated to the external computer system when the sensor component is disengaged from the sensor. A non-maskable interrupt is used to couple the sensor to the controller which is in communications with the external computer system. The sensor component is a magnet, light passage blocker, or mechanical sensor component, and the sensor is a hall-effect sensor, an optical sensor, or a mechanical sensor.

15 Claims, 2 Drawing Sheets

AUTO ENABLE/DISABLE SYSTEM AND METHOD FOR COMPUTER INTERFACED DEVICES

BACKGROUND OF THE INVENTION

1. Technical Field

The present invention relates in general to an auto enable/disable system and method for computer interfaced devices and in particular to a system and method that automatically communicates to systems and/or persons when a computer interfaced device, such as a serial RAID disk drive, has been enabled or disabled/removed.

2. Description of the Related Art

Some present computer systems have the ability to recognize devices that are added to a bus while the computer is operating, that is, without having to reboot the system. "Plug and play" operations allow a computer to configure itself automatically to work with peripherals. The "plug and play" operation allows a computer system to recognize a new device that has been added, but the system typically has to be reset in order to properly initialize the added device with the operating system. "Hot plug" systems and methods were developed as an improvement in this area. In "hot plug" systems and methods, separate reset lines and other features are provided for each peripheral device, such that a device is able to be initialized with the operating system without requiring the entire system to be rebooted (i.e. "hot-pluggable" system).

"Hot-pluggable" devices may be interfaced under various protocols, such as small computer system interface (SCSI), serial storage architecture (SSA), and fiber channel arbitrated loop (FCAL). FIG. 1 shows a SSA example wherein an overall RAID system 10 with target disk drives 12, that is target drives T0, T1, and T2, are serially linked together to a SSA initiator 25. The SSA RAID system 10 is coupled to and communicates with a central processing unit (CPU) 11 and a host computer 16. FIG. 1 shows that the "hot-pluggable" target disk drives 12 are removable from the overall RAID system 10 and thus unlinked from the host computer 16. Typically, a cam mechanism or carrier lever 14 latches the target disk drive 12 to a disk drive drawer (see FIG. 2). One of the target disk drives 12 is removed from the drawer by unlatching the cam 14, and the serial link or interface is broken when the target disk drive 12 is physically removed from the drawer.

The problem with the breaking of this link is that the host computer 16 has no way of distinguishing that the target disk drive 12 has been removed over actual problems with the target disk drive 12 or software. Therefore, the host computer 16 assumes that a problem with the target disk drive 12 exists even though the target disk drive 12 has been removed, and various extensive routines and troubleshooting and search algorithms are executed to identify and find the problem despite the fact that the target disk drive 12 has been removed. The computer system 16 attempts to talk to the target disk drive 12 to find a problem, such as data error, power loss, or disk drive removal. In other words, when a target disk drive 12 is removed, the computer system 16 cannot distinguish that the back plane connection for that target disk drive 12 and the link 30 from connector 17 to SSA initiator 25 have been broken. The host computer 16 assumes that a problem exists and consumes valuable time, power, and computer resources in attempting to identify the problem and to finally find out that the target disk drive 12 has simply been removed. Therefore, the disadvantage and problem with a removable computer interfaced device is that no system or method exists for communicating to the host computer system the fact that such a device has been removed therefrom.

It would therefore be advantageous and desirable to have a system and method of communicating to the SSA initiator and the host computer when a computer interfaced device has been removed from an overall system. It would be advantageous and desirable to provide an automatic enable and disable system and method when a computer interfaced device has been removed from an overall system. It would also be advantageous and desirable to provide a communications system and method to a host computer and to a SSA initiator when an interfaced device has been unlatched and about to be removed from a system, such as when a "hot-pluggable" disk drive has been unlatched and about to be removed from a serial RAID system.

SUMMARY OF THE INVENTION

It is therefore one object of the present invention to provide a system and method of communicating to an overall system when a computer interfaced device has been unlatched and about to be removed from the overall system.

It is another object of the present invention to provide an automatic enable and disable system and method when a computer interfaced device has been removed from an overall system.

It is a further object of the present invention to provide a communications system and method to a host computer and to a SSA initiator when an interfaced device has been unlatched and about to be removed from the host computer and the SSA initiator, such as when a "hotpluggable" disk drive has been unlatched and about to be removed from a serial RAID system.

It is still a further object of the present invention to provide a communications system and method that communicates removal of an interfaced device to avoid the execution of various extensive routines and troubleshooting and search algorithms for identifying and finding the problem when the interfaced device, such as a target disk drive, has in fact been removed.

The foregoing objects are achieved as is now described. An automatic enable and disable system and method for a computer interfaced device linkable to an external computer system. Communication occurs when a computer interfaced device has been latched to and inserted into or unlatched and about to be removed from the external computer system. A sensor is coupled to a of the computer interfaced device, and a sensor component is coupled to a cam mechanism or other such component of the computer interfaced device. The sensor component is engagable to and disengagable from the sensor. The sensor senses engaging and disengaging of the sensor component respectively thereto and therefrom as the cam mechanism or such component is latched and unlatched. Latching of the cam mechanism or such component and the computer interfaced device is communicated to the external computer system when the sensor component is engaged to the sensor. Unlatching of the cam mechanism or such component and the fact that the computer interfaced device is about to be removed from the external computer system is communicated to the external computer system when the sensor component is disengaged from the sensor. A non-maskable interrupt is used to couple the sensor to the controller which is in communications with the external computer system. The sensor component is a magnet, light passage blocker, or mechanical sensor component, and the sensor is a hall-effect sensor, an optical sensor, or a mechanical sensor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a system and method of communicating to an overall system when a computer interfaced device has been unlatched and about to be removed from the overall system. The present invention discloses an automatic enable and disable system and method when a computer interfaced device has been respectively latched to or unlatched from an overall system. The present invention is not in any way limited to the devices disclosed in this specification, and it may be used in conjunction with devices that are interfaced under various protocols, such as small computer system interface (SCSI), serial storage architecture (SSA), and fiber channel arbitrated loop (FCAL).

Figure 1:
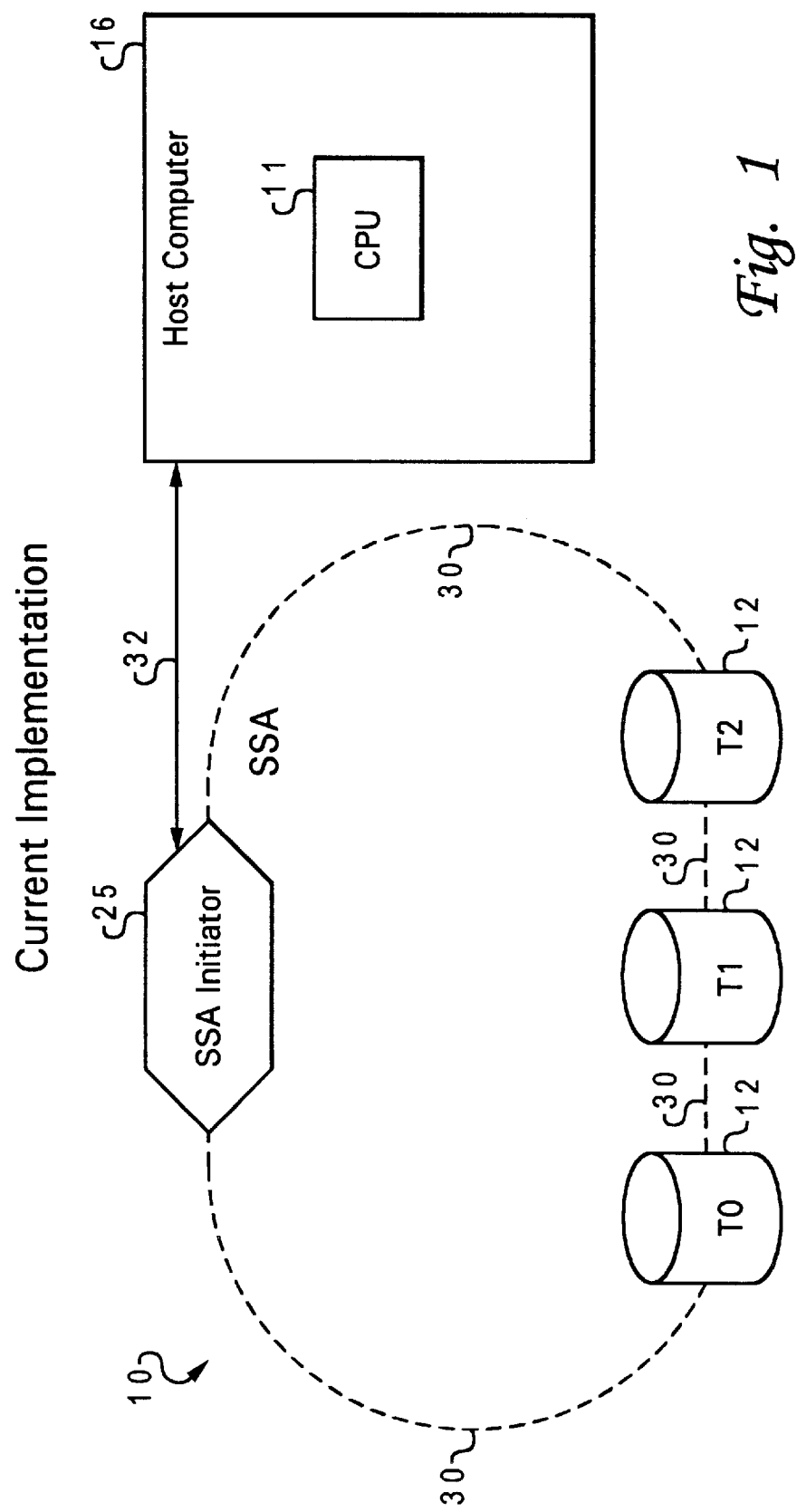
FIG. 1 is a block diagram of an overall RAID system with removable "hot-pluggable" target disk drives that are serially linked together.

With reference now to the figures and in particular with reference to FIG. 1, an overall SSA RAID system 10 with removable "hot-pluggable" target disk drives 12, that is target drives T0, T1, and T2, are shown serially linked together. A cam mechanism or carrier lever 14 latches each of the target disk drives 12 (target disk drives T0, T1, and T2) into the drawer of the RAID system 10. The disk drives 12 are serially linked together to a SSA initiator 25. The SSA RAID system 10 is coupled to and communicates with a host computer 16 that has a central processing unit (CPU) 11. When a target disk drive 12 is inserted into and latched to the drawer via cam 14 and the target disk drive 12 is linked to the SSA RAID system 10, the present invention communicates to the SSA initiator 25, which in turn communicates to the host computer 16, that such latching and linking of the target disk drive 12 exists. When a target disk drive 12 is unlatched from the drawer, the present invention allows a message to be sent within an immediate time frame, such as one second, from or over the target disk drive 12 to the SSA initiator 25 in turn to the host computer 16 to know that unlatching of the target disk drive 12 has occurred and that removal of that target disk drive 12 is about to occur. The present invention takes into consideration that a very short time frame, such as at least the immediate time frame amount or one second, exists between the time the cam mechanism is unlatched and the time when the back plane connection for that target disk drive 12 and the respective link 30 from the drive's connector 17 to the SSA initiator is broken at the time the target disk drive 12 is physically removed (see FIG. 2). A message is posted to the SSA initiator 25 reflecting such unlatching and removal of the target disk drive 12 or breaking of such connection. The present invention provides an automatic enable and disable system and method that senses and communicates to the SSA initiator 25 and the host computer 16 the insertion of a target disk drive 12 into the SSA RAID system 10 or the breaking or linking of the connection and the respective removal of the target disk drive 12 from the SSA RAID system 10.

Figure 2:
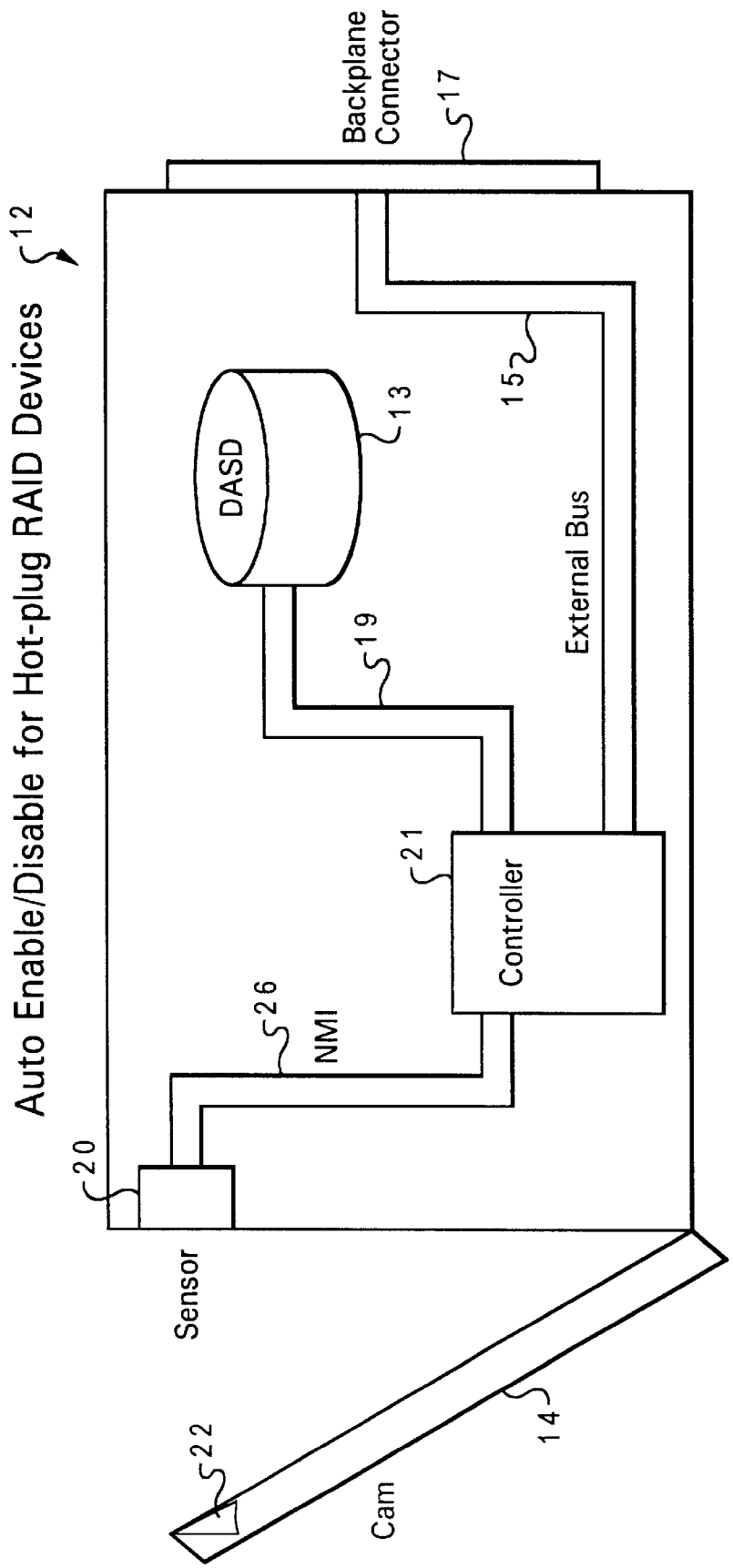
FIG. 2 is a block diagram of the present invention automatic enable and disable system used with each of the removable target disk drives for sensing and communicating to a SSA initiator and a host computer when latching or unlatching of the target disk drive has occurred and respectively when insertion or removal of the target disk drive is about to occur.

With reference now to FIG. 2, the automatic enable and disable system and method for a removable interfaced device is shown in a target disk drive 12. A sensor magnet 22 is located on each disk drive cam 14, and a sensor 20 is coupled generally near each disk drive cam 14 to be engagable to the sensor magnet 22. The sensor 20 is coupled to the controller 21 of the target disk drive 12 via a non-maskable interrupt (NMI) 26, which is an interrupt communication that the controller 21 cannot postpone. As shown in FIGS. 1 and 2, the target disk drives 12 are each linked to the SSA initiator 25 via the link 30, and the SSA initiator 25 communicates with the host computer 16 via communication link 32. In FIG. 2, an external bus interfaced 15 links the controller 21 to a back plane connector 17. The back plane connector 17 provides outside communications to outside systems, devices, or persons, such as to the SSA initiator 25. Also, a direct access storage device (DASD) 13 is coupled to the controller 21 via link 19.

When a target disk drive 12 is inserted and linked to the SSA initiator 25 that is in communication with the host computer 16, the cam 14 is latched to a respective disk drive drawer. When this latching occurs, the sensor magnet 22 is engaged to the sensor 20. The sensor 20 senses and recognizes that the respective target disk drive 12 is latched and exists within the SSA RAID system 10. The sensor 20 sends communications to the controller 21 via the NMI 26 that the target disk drive 12 is latched and in tact. The controller 21, in turn, sends communication and messages to the SSA initiator 25 via the external bus 15, the back plane connector 17, and the link 30, which in turn sends communication and messages to the host computer 16 via link 32, that the respective target disk drive 12 is latched and in tact.

On the other hand, when a target disk drive 12 has been unlatched and about to be removed from the SSA RAID system 10 (i.e. about to be unlinked from the SSA initiator 25), the cam 14 is unlatched from its respective disk drive drawer. When this unlatching of the cam 14 occurs, the sensor magnet 22 is disengaged from the sensor 20. The sensor 20 senses and recognizes that the respective target disk drive 12 is unlatched and about to be removed from the SSA RAID system 10. The sensor 20 immediately sends communications to the controller 21 via the NMI 26 that the respective disk drive 12 has been unlatched and about to be removed. The controller 21, in turn, sends communication and messages to the SSA initiator 25 via the external bus 15, the back plane connector 17, and the link 30, which in turn sends communication and messages to the host computer 16 via link 32 that the respective target disk drive 12 is unlatched and will be removed.

Since the sending of the communications from the sensor 20 to the controller 21 cannot be postponed via NMI 26, the controller 21 is forced to immediately branch to a service routine to send communications to the SSA initiator 25 and the host computer 16 informing them of the fact that the respective disk drive 12 has been unlatched and will be removed. A message, such as an asynchronous alert message, is posted to the SSA initiator 25 and/or the host computer 16 advising it of the fact that the respective target disk drive 12 has been unlatched and will be removed. Since the host computer 16 immediately knows that the respective target disk drive 12 has been unlatched and then accordingly removed, then the host computer 16 avoids the execution of various routines and troubleshooting/search algorithms for identifying and finding a problem with the target disk drive 12 that has in fact been removed. The host computer 16 also avoids further inquiry of the removed target disk drive 12 as well.

The sensor 20 is a hall-effect sensor, and the sensor component 22 is a magnet. The sensor and sensor component for the present invention, however, are not in any way limited respectively to a hall-effect sensor and a magnet, and any type of sensors and sensor components, such as an optical sensor and light passage blocker or a mechanical sensor and mechanical sensor component, may be used with the present invention.

While the invention has been particularly shown and described with reference to a preferred embodiment, it will be understood by those skilled in the art that various changes in form and detail may be made therein without departing from the spirit and scope of the invention.

What is claimed is:

1. An automatic enable and disable system for a computer interfaced device linkable to an external computer system comprising:

a computer interfaced device including a sensor and a controller, wherein the sensor is coupled to the controller, and wherein the controller is capable of communicating with the external computer system, a sensor component coupled to the computer interfaced device wherein the sensor component is engagable to and disengagable from the sensor, and wherein the sensor senses engaging and disengaging of the sensor component respectively thereto and therefrom and wherein sensor communicates the latching of the computer interfaced device to the external computer system when the sensor component is engaged to the sensor and communicates unlatching of the computer interfaced device from the external computer system when the sensor component is disengaged from the sensor.

2. The automatic enable and disable system according to claim 1 further comprising:

a non-maskable interrupt signal transmitted between the sensor and the controller, when the sensor senses.

3. The automatic enable and disable system according to claim 1 wherein the sensor component is a magnet.

4. The automatic enable and disable system according to claim 1 wherein the sensor component is a light passage blocker.

5. The automatic enable and disable system according to claim 1 wherein the sensor component is a mechanical sensor component.

6. The automatic enable and disable system according to claim 1 wherein the sensor is a hall-effect sensor.

7. The automatic enable and disable system according to claim 1 wherein the sensor is an optical sensor.

8. The automatic enable and disable system according to claim 1 wherein the sensor is a mechanical sensor.

9. The automatic enable and disable system according to claim 1 wherein the computer interfaced device is a target disk drive.

10. The automatic enable and disable system according to claim 9 wherein the target disk drive further comprises:

a controller coupled to the sensor, a direct access storage device coupled to the controller, an external bus interfaced coupled to the controller, and a back plane connector coupled to the external bus interfaced wherein the back plane connector is able to communicate to the external computer system.

11. The automatic enable and disable system according to claim 1 wherein the computer interfaced device is a hot-pluggable device.

12. The automatic enable and disable system according to claim 11 wherein the hot-pluggable device is a RAID disk drive.

13. The automatic enable and disable system according to claim 1 wherein the external computer system is a host RAID computer system.

14. The automatic enable and disable system according to claim 1 wherein the computer interfaced device further comprises a cam mechanism and the sensor is coupled to the cam mechanism.

15. An automatic enable and disable system for a plurality of computer interfaced devices each having a controller that is in communications with an external computer system comprising:

a sensor contained within each of the plurality of computer interfaced devices coupled to the controller, a sensor component coupled to each of the plurality of the computer interfaced devices wherein the sensor component is engagable to and disengagable from the respective sensor, and wherein the sensor senses engaging and disengaging of the sensor component respectively thereto and therefrom and wherein the controller communicates to the external computer system latching of the computer interfaced devices when the respective sensor component is engaged to the sensor and unlatching of the computer interfaced device when the sensor component is disengaged from the sensor.

* * * * *